United States Patent [19]

Schubart et al.

[11] 4,340,695
[45] Jul. 20, 1982

[54] VULCANIZATION SYSTEM, RUBBER MIXTURE CONTAINING SAID SYSTEM AND A PROCESS OF VULCANIZATION

[75] Inventors: Rüdiger Schubart, Bergisch-Gladbach; Ulrich Eholzer; Theo Kempermann, both of Cologne; Ernst Roos, Odenthal-Osenau, all of Fed. Rep. of Germany

[73] Assignee: Bayer Aktiengesellschaft, Leverkusen, Fed. Rep. of Germany

[21] Appl. No.: 252,051

[22] Filed: Apr. 8, 1981

[30] Foreign Application Priority Data

Apr. 17, 1980 [DE] Fed. Rep. of Germany ....... 3014717

[51] Int. Cl.³ .......................... C08K 5/37; C08K 5/44; C08K 5/41
[52] U.S. Cl. .................................. 525/350; 252/182; 260/5; 260/779 R; 260/783; 260/795; 525/343; 525/351
[58] Field of Search ................ 252/182; 525/343, 351, 525/350; 260/779 R, 795, 5, 783

[56] References Cited

U.S. PATENT DOCUMENTS

| | | | |
|---|---|---|---|
| 3,579,460 | 5/1971 | Kerwood | 252/182 |
| 3,630,940 | 12/1971 | Leshin | 252/182 |
| 3,678,017 | 7/1972 | Shelton et al. | 252/182 |
| 3,844,970 | 10/1974 | Kempermann | 252/182 |
| 3,919,179 | 11/1975 | Maxey | 252/182 |
| 4,012,332 | 3/1977 | Behrens | 252/182 |
| 4,116,855 | 9/1978 | Behrens | 252/182 |

*Primary Examiner*—Irwin Gluck
*Attorney, Agent, or Firm*—Connolly and Hutz

[57] ABSTRACT

A vulcanization system consisting of
(a) 20-50 parts by weight of sulphur or 20-50 parts by weight of a sulphur donor,
(b) 20-50 parts by weight of an accelerator of the mercapto or sulphenamide group,
(c) 0-10 parts by weight of a conventional accelerator additive, and
(d) 20-50 parts by weight of a compound corresponding to the general formula (i):

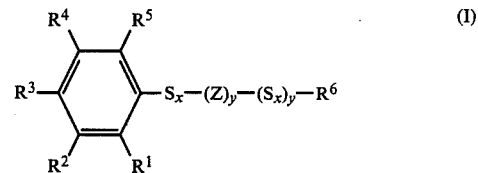

wherein
$R_1$ to $R_5$ are identical or different and denote hydrogen, halogen, nitro, cyano, $CF_3$, $CCl_3$, carboxyl, an alkoxy group containing 1-4 C-atoms in the alkyl part, or a $C_1$-$C_4$ alkyl group but the groups $R_1$-$R_5$ must not all be hydrogen;
x represents 1-4, preferably 2-3,
y represents 0 or 1, and
Z denotes divalent groups such as

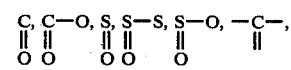

$C_1$-$C_{12}$ alkylene, $C_4$-$C_{12}$ cycloalkylene, $C_6$-$C_{10}$ arylene or $C_8$-$C_{12}$ arylalkylene, and
$R_6$ denotes the group corresponding to the formula:

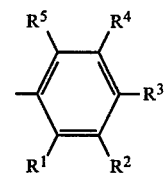

wherein $R_1$-$R_5$ have the meaning indicated above and may all be hydrogen;
$C_1$-$C_{12}$ alkyl or a $C_4$-$C_{12}$ cycloalkylene optionally substituted by OH and/or alkoxy with 1-4 C-atoms in the alkoxy group;
benzyl or trichloromethyl, whereby the sum of the components (a)-(d) is 100 can be used for vulcanizing natural or synthetic rubber.

6 Claims, No Drawings

VULCANIZATION SYSTEM, RUBBER MIXTURE CONTAINING SAID SYSTEM AND A PROCESS OF VULCANIZATION

This invention relates to a vulcanization system consisting of sulphur and/or a sulphur donor, a mercapto or sulphenamide accelerator, a compound containing a thiophenyl group, and a conventional additional accelerator, a vulcanizable rubber mixture consisting of natural and/or synthetic rubber, the above mentioned vulcanization system and the usual additives, and a process for its vulcanization.

The vulcanization system according to the invention may be used to vulcanize rubbers which have improved resistance to reversion after this vulcanization.

The term "reversion" means a reduction in the degree of cross-linking and deterioration in the mechanical properties of the vulcanizates (such as tensile strength, tear propagation resistance, elasticity) as vulcanization is continued beyond the optimum. Reversion occurs in the vulcanization of diene rubbers, particularly in natural rubber and synthetic polyisoprene, at the high vulcanization temperatures and long vulcanization times required for the production of bulky articles (e.g. tires for heavy motor vehicles). The employment of the high vulcanization temperatures which would be desirable from an economical point of view is limited by this reversion.

Improvement in the resistance to reversion has hitherto been possible only to a very limited extent.

It is known that the reversion resistance of vulcanization systems can be improved by using smaller quantities of sulphur. Whereas in so-called normal sulphur vulcanization the quantities of sulphur used are about 1.8 to 2.5 phr (parts by weight, based on 100 parts by weight of rubber), "semi-efficient systems" operate with medium quantities of sulphur amounting to about 1 to 1.8 phr while "efficient systems" use less than 1 phr of sulphur. Compared with normal sulphur vulcanization, however, the use of smaller quantities of sulphur entails disadvantages with regard to the tear resistance, tear propagation resistance, abrasion resistance and tyre cord bonding of the vulcanizates, so that the application of vulcanization with low or medium quantities of sulphur is limited. In the manufacture of tyres, for example, the quantity of sulphur cannot be lowered below medium doses (about 1.5).

It is also known that the nature of the vulcanization accelerators used has an influence on the reversion resistance of rubber mixtures. Whereas ultra accelerators such as dithiocarbamates and thiurams and basic accelerators such as diphenyl guanidine result in a low resistance to reversion, mercapto accelerators such as mercapto benzothiazole, dibenzothiazyldisulphide and the zinc salt of mercaptobenzothiazole and sulphenamide accelerators such as benzothiazyl-2-cyclo hexyl-sulphenamide, benzothiazyl-2-tertiary-butyl-sulphenamide, benzothiazyl-2-morpholine-sulphenamide and benzothiazyl-dicyclohexylsulphenamide provide greater resistance to reversion.

It is therefore known in the art to build up vulcanization systems for diene rubbers with improved reversion resistance as follows:
(a) medium sulphur quantities (about 1.4–1.6 phr) and
(b) mercapto or sulphenamide accelerators (about 1–2 phr).

Vulcanization systems of this type, however, also give rise to reversion at high vulcanization temperatures (e.g. above 170° C.) or long heating times.

It is also known that the addition of vulcanization accelerators of the dithiophosphate type such as zinc dibutyldithiophosphate to the vulcanization systems described above improves their resistance to reversion (H. Ehrend, Gummi Asbest Kunststoffe 3 c (1977) page 68–71). Although these accelerators improve reversion, they also have the undesirable effect of shortening the prevulcanization time. This is a disadvantage since reliable processing conditions are particularly important in those fields of application in which improved resistance to reversion is also important, e.g. in the manufacture of tires for trucks and lorries and the manufacture of high bulk articles in general.

It is therefore an object of the present invention to provide a vulcanization system which increases the resistance to reversion of rubber vulcanizates without shortening the prevulcanization time.

This invention therefore provides a vulcanization system consisting of
(a) 20–50 parts by weight, preferably 40–50 parts by weight, of sulphur or 20–50 parts by weight, preferably 40–50 parts by weight, of a sulphur donor,
(b) 20–50 parts by weight, preferably 20–30 parts by weight, of an accelerator from the mercapto or sulphenamide group,
(c) 0–10 parts by weight, preferably 0–5 parts by weight, of a conventional accelerator additive, and
(d) 20–50 parts by weight, preferably 20–30 parts by weight, of a compound corresponding to the general formula (I)

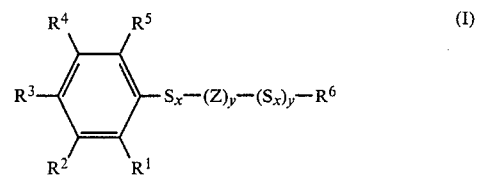

wherein
$R_1$ to $R_5$ are identical or different and denote hydrogen, halogen, nitro, cyano, $CF_3$, $CCl_3$, carboxyl or an alkoxy group containing a $C_1$–$C_4$ alkyl group, but the groups $R_1$–$R_5$ must not all be hydrogen,
x represents 1–4, preferably 2–3,
y represents 0 or 1, and
Z denotes divalent groups such as

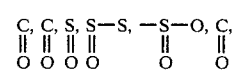

alkylene with 1–12 C-atoms, cycloalkylene with 4–12 C-atoms, arylene with 6–10 C-atoms and arylalkylene with 8–12 C-atoms, and
$R^6$ denotes the group corresponding to the following formula

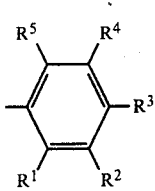

wherein the substituents $R_1$–$R_5$ have the meaning indicated above and may all be hydrogen;

$R_6$ may also denote a $C_1$–$C_{12}$ alkyl group or a $C_4$–$C_{12}$ cycloalkylene group which may be substituted by Oh or alkoxy with 1–4 C-atoms in the alkoxy group.

$R_6$ may also denote benzyl or trichloromethyl.

The sum of the components a–d is 100.

The halogen may be, for example, chlorine, bromine, or iodine.

The $C_1$–$C_4$ alkyl groups may be methyl, ethyl, isopropyl, n-propyl, n-butyl, iso-butyl, or tertiary butyl.

The alkoxy groups may be, for example, methoxy, ethoxy, propoxy or butyloxy.

The $C_1$–$C_{12}$ alkylene groups may be methylene, ethylene, 1,2- and 1,3-propylene, butylene, pentylene, hexylene, octylene, nonylene, decylene, undecylene or dodecylene.

The $C_1$–$C_{12}$ alkyl groups can easily be derived from the above-mentioned alkylene groups.

The cycloalkylene groups may have 4–12 C-atoms, e.g. cyclobutylene, cyclopentylene, cyclohexylene, cycloheptylene, cyclooctylene, cyclononylene, cyclodecylene, cycloundecylene or cyclododecylene.

Arylene may be phenylene or naphthylene.

The arylalkylene groups should have from 8–12 C-atoms and include o-, m- and p- xylylene and the isomeric naphthalene dimethyl derivatives.

The invention also provides a vulcanizable mixture consisting of natural and/or synthetic rubber of halogen-free dienes, the above-mentioned vulcanization systems and optionally other conventional additives.

This invention further provides a process for the vulcanization of natural and/or synthetic rubber from halogen-free dienes in the presence of sulphur and/or sulphur donors, vulcanization acclerators and optionally the usual additives, characterised in that (a) 0.1–5 phr, preferably 1–2 phr, of sulphur or 0.2–10 phr, preferably 2–4 phr, of a sulphur donor, (b) 0.1–5 phr, preferably 0.4–2 phr, of an accelerator of the mercapto or sulphenamide group, (c) 0–5 phr, preferably 0–1 phr, of a conventional accelerator additive, and (d) 0.1–5 phr, preferably 0.4–2.5 phr, of a compound corresponding to the general formula (I), are added to the rubber separately or together and the mixture is then vulcanized in the usual manner.

Compounds (d) may be added in the pure form or as mixtures.

Compounds which split off sulphur under the vulcanization conditions are regarded as sulphur donors at group (a). These include, for example, dimorpholyldisulphide (DTDM), tetramethylthiuramic disulphide (TMTD) and 2-(4-morpholinyldithio)-benzothiazole.

The following are examples of accelerators of the mercapto group in (b): 2-mercaptobenzothiazole (MBT), dibenzothiazyl-disulphide (MBTS) and the zinc salt of 2-mercapto benzothiazole (ZMBT).

The following are examples of accelerators of the sulphenamide group in (b): benzothiazyl-2-cyclohexylsulphenamide (CBS), benzothiazyl-2-tertiary butylsulphenamide (TBBS), benzothiazyl-2-morpholine sulphenamide (MBS), 2-(N-morpholinyldithio)-benzothiazole (MBSS) and morpholinyl-thiocarbonylsulphene morpholide (OTOS).

MBT, MBTS, CBS, TBBS and MBS are preferred.

The following are examples of conventional accelerator additives in (c): tetramethylthiuramic disulphide (TMTD), tetramethylthiuramic monosulphide (TMTM), zinc-N-dimethyldithiocarbamate (ZDMC) zinc-N-diethyl-dithiocarbamate (ZDEC), zince-N-dibutyl-dithiocarbamate (ZDBC), zinc-N-ethylphenyl-dithiocarbamate (ZEPC) and zinc-N-pentamethylene-dithiocarbamate (Z5MC).

The following are examples of compounds (d):
bis-(pentachlorophenyl)-disulphide,
bis-(pentachlorophenyl)-trisulphide,
bis-(pentachlorophenyl)-tetrasulphide,
bis-(pentachlorophenyl)-dithiomethane,
bis-(pentachlorophenyl)-dithio-1,2-ethane,
2-(pentachlorophenyl-dithio)-acetaldehyde-diethylacetal,
pentachlorophenyl-dithio-2-propane,
pentachlorophenyl-dithio-1-propane,
pentachlorophenyl-dithio-butane,
pentachlorophenyl-dithio-pentane,
pentachlorophenyl-dithio-hexane,
pentachlorophenyl-dithio-heptane,
pentachlorophenyl-dithio-octane,
pentachlorophenyl-dithio-(2-ethylhexane),
pentachlorophenyl-dithio-nonane,
pentachlorophenyl-dithio-decane,
pentachlorophenyl-dithio-undecane,
pentachlorophenyl-dithio-dodecane,
pentachlorophenyl-dithio-tertiary dodecane,
pentachlorophenyl-dithio-cyclobutane,
pentachlorophenyl-dithio-cyclohexane,
pentachlorophenyl-dithio-cycloheptane,
pentachlorophenyl-dithio-cyclooctane,
pentachlorophenyl-dithio-cyclononane,
pentachlorophenyl-dithio-cycloundecane,
pentachlorophenyl-dithio-benzene,
pentachlorophenyl-dithio-(2-methylbenzene),
pentachlorophenyl-cithio-(4-methylbenzene),
pentachlorophenyl-dithio-(4-butylbenzene),
pentachlorophenyl-dithio-(4-nonyl-benzene),
pentachlorophenyl-dithio-(4-dodecyl-benzene),
pentachlorophenyl-dithio-(4-tertiary-butyl-benzene),
pentachlorophenyl-dithio-(4-chlorobenzene),
pentachlorophenyl-dithio-(4-methoxybenzene),
pentachlorophenyl-dithio-(2-hydroxycarbonyl-benzene),
pentachlorophenyl-dithio-(2-methoxycarbonyl-benzene),
pentachlorophenyl-dithio-(2,3,4-trichlorobenzene),
pentachlorophenyl-dithio-(2-trichloromethyl-benzene),
pentachlorophenyl-dithio-(2-cyanobenzene),
pentachlorophenyl-dithio-(2-trifluoromethyl-benzene),
pentachlorophenyl-dithio-(2-nitro-benzene),
pentachlorophenyl-dithio-(4-nitro-benzene),
pentachlorophenyl-dithio-(2,4-dimethylbenzene),
pentachlorophenyl-dithio-(2-ethanol),
pentachlorophenyl-dithio-(2-butanol-(1)),
pentachlorophenyl-dithio-(2-propanol),
pentachlorophenyl-dithio-(3-butanol-(2)),
pentachlorophenyl-dithio-(2-cyclopentanol-(1)),
pentachlorophenyl-dithio-(2-cyclohexanol-(1)),
pentachlorophenyl-dithio-(phenylethanol-2), pentachlorophenyl-dithio-2(2,2-dimethylethanol-1),
pentachlorophenyl-dithio-acetate,
pentachlorophenyl-dithio-benzoate,
pentachlorophenyl-dithio-propionate,
pentachlorophenyl-dithio-phenylsulphinate,
pentachlorophenyl-dithio-(4-chlorophenylsulphinate),
pentachlorophenyl-dithio-acetic-acid,
pentachlorophenyl-thiophenylsulphinate,
pentachlorophenyl-thio-(4-chlorophenylsulphinate),
pentachlorophenyl-dithio-(4-methylphenylsulphinate),
pentachlorophenyl-thio-(4-methylphenylsulphinate),
pentachlorophenyl-dithio-carbonate,
pentachlorophenyl-trithio-carbonate,
pentachlorophenyl-dithio-phenylsulphite,
bis-(pentachlorophenyl-dithio)-1,2-ethane,
bis-(pentachlorophenyl-dithio)-1,3-propane,
bis-(pentachlorophenyl-dithio)-1,4-butane,
bis-(pentachlorophenyl-dithio)-1,2-propane,
bis-(pentachlorophenyl-dithio)-1,5-pentane,
bis-(pentachlorophenyl-dithio)-1,6-hexane,
bis-(pentachlorophenyl-dithio)-1,7-heptane,
bis-(pentachlorophenyl-dithio)-1,8-octane,
bis-(pentachlorophenyl-dithio)-1,9-nonane,
bis-(pentachlorophenyl-dithio)-1,10-decane,
bis-(pentachlorophenyl-dithio)-1,11-undecane,
bis-(pentachlorophenyl-dithio)-1,12-dodecane,
bis-(pentachlorophenyl-dithio)-1,4-cyclohexane,
bis-(pentachlorophenyl-dithio)-1,2-cyclohexane,
bis-(pentachlorophenyl-dithio)-1,3-cyclopentane,
bis-(pentachlorophenyl-dithio)-1,4-cycloheptane,
bis-(pentachlorophenyl-dithio)-1,2-benzene,
bis-(pentachlorophenyl-dithio)-1,3-benzene,
bis-(pentachlorophenyl-dithio)-1,4-benzene,
bis-(pentachlorophenyl-dithio)-2,4-toluene,
bis-(pentachlorophenyl-dithiomethyl)-1,2-benzene,
bis-(pentachlorophenyl-dithiomethyl)-1,3-benzene,
bis-(pentachlorophenyl-dithiomethyl)-1,4-benzene,
bis-(4-methylphenyl)-disulphide,
bis-(4-methylphenyl)-trisulphide,
bis-(4-methylphenyl)-tetrasulphide,
bis-(4-chlorophenyl)-disulphide,
bis-(4-chlorophenyl)-trisulphide,
bis-(4-chlorophenyl)-tetrasulphide,
bis-(4-tertiary-butylphenyl)-disulphide,
bis-(4-tertiary-butylphenyl)-trisulphide
bis-(4-tertiary-butylphenyl)-tetrasulphide,
bis-(4-methoxy-carbonylphenyl)-trisulphide,
bis-(2-hydroxy-carbonylphenyl)-disulphide,
bis-(2-hydroxy-carbonylphenyl)-trisulphide,
bis-(2-hydroxy-carbonylphenyl)-tetrasulphide,
bis-(2-cyanophenyl)-disulphide,
bis-(2-cyanophenyl)-trisulphide,
bis-(2-cyanophenyl)-tetrasulphide,
bis-(2,3,4-trichlorophenyl)-disulphide,
bis-(2,3,4-trichlorophenyl)-trisulphide,
bis-(2,3,4-trichlorophenyl)tetrasulphide,
pentachlorophenyl-dithio-trichloromethane,
pentachlorophenyl-dithio-methylbenzene,
pentachlorophenyl-dithio-phenylmethane,
bis-(4-methoxyphenyl)-disulphide,
bis-(4-methoxyphenyl)-trisulphide,
bis-(4-methoxyphenyl)-tetrasulphide,
bis-(2-nitrophenyl)-disulphide,
bis-(2-nitrophenyl)-trisulphide,
bis-(2-nitrophenyl)-tetrasulphide,
bis-(2-nitro-4-trifluoromehylphenyl)-disulphide,
bis-(pentachlorophenyl-thio)-methane,
bis-(2,4,5-trichlorophenyl)-trisulphide,
pentachlorophenyl-dithio-(4-chlorobenzene),
pentachlorophenyl-dithio-(2-acetic-acid-monoglycol-ester),
pentachlorophenyl-dithio-(2-acetic-acid-diethylene-glycol-monoester).
pentachlorophenyl-dithio-(2-acetic acid-ethyl ester).

Some of the above-mentioned compounds are new and others are known in the literature. They may be prepared by methods known in the literature, e.g. as described by R. Otto, in Journal für praktische Chemie (2) 37, 208; or a method analogous to that of U.S. Pat. No. 2,695,898.

The vulcanization systems according to the invention are advantageous in their reversion resistance after long vulcanization times and/or high vulcanization temperatures (e.g. 45 minutes at 180° C.) as regards their mechanical properties such as tension value, tensile strength, elongation at break, hardness, elasticity, tear propagation resistance, resistance to crushing, fatigue strength, heat build up, dynamic flow and abrasion.

The individual components of the vulcanization system may be added to the diene rubbers or rubber mixtures before vulcanization either separately or in the form of a mixture or a rubber-accelerator premix (see Ullmann's Encyklopädie deer techn. Chemie, 3rd Edition, Publishers Urban & Schwarzenberg, Munich-Berlin, 1957 Volume 9, page 364).

The following are examples of synthetic rubbers obtained from halogen-free dienes: polyisoprene, polybutadiene, styrene-butadiene rubber, nitrile rubber and blends thereof.

The diene rubbers may contain any of the usual additives such as fillers, in particular carbon black, mineral oils, plasticizers, adhesifying agents, acceleration activators, in particular stearic acid, waxes, age resistors, ozone protective agents, blowing agents, dyes or pigments.

Fillers such as the types of carbon black used in the rubber processing industry, silicates, in particular finely divided silicates obtained in the gaseous phase and hydrophobic silicates, and finely divided metal oxides, including mixed oxides and oxide mixtures, are valuable constituents of the mixture.

Vulcanization of the diene rubbers is generally carried out at temperatures in the range of from 100° C. to about 300° C., preferably at 140°–240° C. Any of the usual vulcanization processes known in the art may be employed, such as heating in presses, heating with super-heated steam or hot air, salt baths, moving bed, ultra high frequency and steam tube.

The invention will be illustrated by the Examples which follow:

| List of abbreviations and test methods | | |
|---|---|---|
| MBT | = | 2-mercaptobenzothiazole |
| MBTS | = | dibenzothiazyl disulphide |
| ZMBT | = | zinc salt of 2-mercaptobenzothiazole |
| CBS | = | benzothiazyl-2-cyclohexyl sulphenamide |
| TBBS | = | benzothiazyl-2-tertiary-butyl sulphenamide |
| MBSS | = | 2-(N-morpholinyl-dithio)benzothiazole |
| DTDM | = | dimorpholyl disulphide |
| MBS | = | benzothiazyl-2-morpholine sulphenamide |
| DCBS | = | benzothiazyl-dicyclohexyl sulphenamide |
| TMTD | = | tetramethyl thiuramic disulphide |
| TMTM | = | tetramethyl thiuramic-monosulphide |
| ZDMC | = | zinc-N-dimethyl dithiocarbamate |
| ZDEC | = | zinc-N-diethyl dithiocarbamate |
| ZDBC | = | zinc-N-dibutyl dithiocarbamate |
| ZEPC | = | zinc-N-ethylphenyl dithiocarbamate |
| Z5MC | = | zinc-N-pentamethylene dithiocarbamate |

| | |
|---|---|
| | -continued |
| | List of abbreviations and test methods |
| TMQ = | polymerised 2,2,4-trimethyl-dihydroquinoline |
| IPPD = | N-phenyl-N'-isopropyl-p-phenylene diamine |
| Vulkameter | Bayer Vulkameter, heat for 1 minute, measuring range 3/20 mV |
| $t_s(30)/130°$ C. (Min.) 160° C. | Prevulcanization time obtained from Vulkameter measurement at 130° C. and 160° C.; time taken for shear modulus curve to rise by 30 mm above the minimum, at $t_s(15)$ by 15 mm above the minimum. |
| Fe-Fa (mm) | Shear modulus (final value minus initial value); in ascending curves, limiting value after 45 minutes testing time at the given temperature, e.g. 160° C.. |
| $t_{90}$ (Min) | complete heating time, time to reach 90% of the maximum shear modulus (Bayer Vulkameter). |
| Step-wise heating | 4 mm flaps, heating in press. |
| $M_{300}$ (MPa) | Tension value at 300% elongation, DIN 53504. |
| F (MPa) | Tear strength, DIN 53504, standard ring R1. |
| D (%) | Elongation at break, DIN 53504, standard ring R1. |
| H (Shore A) | Hardness Shore A, DIN 53504, standard ring R1. |
| E (%) | Recoil elasticity, DIN 53512, 4 mm flap. |
| Structure according to Pohle (N) | Ring structure. |
| Reversion (%) | From step-wise heating: $\frac{M_{300} \text{ after } 45'/180° \text{ C.}}{M_{300} - \text{max at } 150° \text{ C.}} \times 100$ |
| ΔT (°C.) | Temperature rise in Goodrich Flexometer DIN 53433, starting temperature 100° C., static preload 10.0 Kg/cm², stroke ± 5.71 mm, frequency: 24 Hz. |
| Fatigue | According to chain test method: Endless toothed profile belt 1.6 m in length (9 individual test samples pinned together) runs under slight tension round 4 guide rollers each 50 mm in diameter (sharp curvature). 17,600 flexures. The test is carried out in the open air. Assessment is according to a given scale: 0 denotes no formation of tears 1 denotes slight formation of tears. |
| Ball crushing | Ball diameter 30 mm |
| | initial force 147 M |
| | additional force in stages of 49 N |
| | maximum force about 1,000 N |
| | number of revolutions 2,000 |
| | speed of rotation 135/Min |
| | running time/force stage 14.8 Min |

EXAMPLE 1

This demonstrates the comparison between a semiefficient system (1) which contains only sulphur and MBS and a system (2) containing zinc dibutyldithiophosphate as additive and a system according to the invention (3) containing pentachlorophenyl-tetrasulphide. A rubber premix was prepared from the following components in an internal mixer:

| | |
|---|---|
| natural rubber | 80.0 phr |
| polybutadiene | 20.0 phr |
| carbon black N 330 (HAF) | 55.0 phr |
| aromatic mineral oil | 3.0 phr |
| stearic acid | 2.5 phr |
| microcrystalline ozone protective wax | 1.0 phr |
| IPPD | 1.5 phr |
| TMQ | 1.0 phr |
| Zinc oxide | 5.0 phr |

The following components were subsequently added and incorporated, using laboratory rollers:

| | | |
|---|---|---|
| System (1) | 1.425 | phr sulphur |
| | 1.20 | phr MBS |
| System (2) | 1.425 | phr sulphur |
| | 0.60 | phr MBS |
| | 1.20 | phr zinc dibutyl-dithio-phosphate |
| System (3) | 1.425 | phr sulphur |
| | 0.60 | phr MBS |
| | 1.20 | phr pentachlorophenyl-tetrasulphide. |

| | 1 | 2 | 3 |
|---|---|---|---|
| Reversion resistance % after 45'/180° C. based on $M_{300}$ | 58 | 72 | 75 |
| Prevulcanization time $t_s$ (Min) at 130° C. | 23 | 10.7 | 17 |
| Time to complete vulcanization $t_{90}$ (Min) at 150° C. | 10.3 | 7.1 | 14.4 |

System (3) clearly provides better reversion resistance (after over vulcanization for 45 minutes at 180° C.) than System (2) containing zinc dibutyl-dithiophosphate and it provides substantially higher prevulcanization resistance at 130° C. then System (2).

EXAMPLE 2

A rubber premix was prepared from the following constituents in an internal mixer:

| | |
|---|---|
| Natural rubber (RSS No. 1) | 100.0 phr |
| Carbon Black N 330 (HAF) | 45.0 phr |
| Zinc oxide | 5.0 phr |
| Stearic acid | 3.0 phr |
| Aromatic mineral oil | 2.5 phr |
| Naphthenic mineral oil | 2.5 phr |
| TMQ | 1.0 phr |
| IPPD | 1.5 phr |

The following mixtures were prepared on laboratory rollers:

| | | |
|---|---|---|
| Mixture (1) | 1.425 | phr sulphur |
| | 1.20 | phr MBS |
| Mixture (2) | 1.425 | phr sulphur |
| | 0.60 | phr MBS |
| | 1.20 | phr pentachlorophenyl-tetrasulphide. |

The tests carried out and the results obtained are summarised in the table below:

| Vulkameter measurement | Mixture (1) | Mixture (2) |
|---|---|---|
| Heating up time: 1 Min | | |
| Prevulcanization time $t_s/130°$ C. (Min) | 23 | 17 |
| Flow time $t_s/150°$ C. (Min) | 6.4 | 4.7 |
| Complete heating time $T_{90}/150°$ C. (Min) | 10.3 | 14.4 |
| Shear modulus Fe-Fa/150° C. (mm) | 101 | 95 |
| Step-wise heating | | |
| F = tensile strength | | |
| D = elongation at break | | |
| M = tension value | | |
| H = hardness | | |

-continued

|  | F | D | $M_{100}$ | $M_{300}$ | H |
|---|---|---|---|---|---|
| Mixture 1 150° C. | 10' | 22.6 | 585 | 1.77 | 8.81 | 63 |
|  | 20' | 22.5 | 525 | 2.41 | 11.21 | 67 |
|  | 30' | 22.2 | 520 | 2.21 | 10.93 | 65 |
|  | 45' | 21.3 | 520 | 2.21 | 11.17 | 65 |
| Mixture 2 150° C. | 10' | 21.9 | 600 | 1.77 | 8.77 | 63 |
|  | 20' | 22.2 | 545 | 2.21 | 10.77 | 65 |
|  | 30' | 22.0 | 530 | 2.17 | 10.81 | 65 |
|  | 45' | 20.9 | 510 | 2.13 | 10.69 | 66 |
| Mixture 1 180° C. | 10' | 19.1 | 585 | 1.57 | 7.25 | 62 |
|  | 20' | 18.5 | 595 | 1.41 | 6.73 | 61 |
|  | 30' | 16.2 | 575 | 1.37 | 6.17 | 59 |
|  | 45' | 16.6 | 570 | 1.41 | 6.61 | 59 |
|  | 60' | 16.3 | 570 | 1.45 | 6.37 | 60 |
| Mixture 2 180° C. | 10' | 18.3 | 540 | 1.65 | 7.89 | 62 |
|  | 20' | 17.8 | 530 | 1.69 | 7.89 | 61 |
|  | 30' | 13.9 | 530 | 1.69 | 7.73 | 62 |
|  | 45' | 17.4 | 520 | 1.77 | 8.09 | 63 |
|  | 60' | 16.7 | 515 | 1.77 | 7.93 | 62 |

Vulcanization System (2) according to the invention shows distinct advantages over comparison System (2) as regards resistance to reversion after over vulcanization at 180° C.

EXAMPLE 3

This demonstrates a comparison between a semiefficient System (1) containing only sulphur and MBS and a system (2) according to the invention which contains pentachlorophenyl-disulphide as additive. A rubber premix was prepared from the following constituents in an internal mixer:

| Natural rubber | 100.0 phr |
|---|---|
| Carbon Black N 330 (HAF) | 45.0 phr |
| Zinc oxide | 5.0 phr |
| Stearic acid | 3.0 phr |
| Aromatic mineral oil | 2.5 phr |
| Naphthenic mineral oil | 2.5 phr |
| TMQ | 1.0 phr |
| IPPD | 1.5 phr |

The following constituents were subsequently added and incorporated, using laboratory rollers:

| System (1) | 1.425 phr sulphur |
|---|---|
|  | 1.20 phr MBS |
| System (2) | 1.425 phr sulphur |
|  | 0.60 phr MBS |
|  | 1.20 phr pentachlorophenyl-disulphide. |

|  | F | D | $M_{100}$ | $M_{300}$ | H | E | Str. |
|---|---|---|---|---|---|---|---|
| System 1 150° C. | 20' | 21.8 | 560 | 1.6 | 8.6 | 60 | 50 | 460 |
|  | 25' | 22.5 | 580 | 1.7 | 8.3 | 60 | 49 | 375 |
|  | 30' | 21.4 | 575 | 1.6 | 8.2 | 60 | 47 | 355 |
|  | 45' | 21.0 | 580 | 1.5 | 7.9 | 59 | 47 | — |
| System 2 150° C. | 20' | 23.7 | 560 | 2.0 | 10.0 | 62 | 49 | 420 |
|  | 25' | 23.7 | 560 | 2.0 | 10.1 | 62 | 49 | 400 |
|  | 30' | 22.8 | 535 | 2.0 | 10.1 | 63 | 49 | 425 |
|  | 45' | 21.5 | 525 | 1.9 | 9.8 | 62 | 49 | — |
| System 1 180° C. | 10' | 16.4 | 580 | 1.1 | 5.6 | 54 | 45 | — |
|  | 20' | 14.5 | 560 | 1.1 | 4.9 | 52 | 44 | — |
|  | 30' | 14.5 | 590 | 1.0 | 4.6 | 52 | 43 | — |
|  | 45' | 13.3 | 570 | 1.0 | 4.6 | 52 | 44 | 77 |
|  | 60' | 13.2 | 555 | 1.1 | 4.7 | 53 | 42 | 80 |
| System 2 180° C. | 10' | 19.2 | 550 | 1.5 | 7.8 | 57 | 47 | — |
|  | 20' | 17.2 | 515 | 1.5 | 7.6 | 58 | 46 | — |
|  | 30' | 15.3 | 480 | 1.5 | 7.4 | 57 | 44 | — |
|  | 45' | 16.5 | 510 | 1.5 | 7.5 | 59 | 45 | 130 |
|  | 60' | 16.8 | 505 | 1.5 | 7.6 | 58 | 45 | 130 |
| System 1 190° C. | 10' | 13.2 | 550 | 1.1 | 4.6 | 51 | 45 | — |
|  | 20' | 12.8 | 565 | 1.0 | 4.3 | 50 | 43 | — |
|  | 30' | 13.8 | 595 | 1.1 | 4.4 | 50 | 42 | — |
|  | 45' | 12.3 | 540 | 1.1 | 4.6 | 51 | 42 | 70 |
| System 2 190° C. | 10' | 17.4 | 525 | 1.5 | 7.4 | 57 | 46 | — |
|  | 20' | 16.6 | 510 | 1.5 | 7.1 | 56 | 43 | — |
|  | 30' | 16.3 | 525 | 1.5 | 6.9 | 56 | 42 | — |
|  | 45' | 15.1 | 495 | 1.5 | 7.0 | 55 | 44 | 115 |
|  | 60' | 5.1 | 510 | 1.5 | 6.7 | 57 | 41 | 94 |
|  | 60' | 13.5 | 560 | 1.1 | 4.7 | 50 | 43 | 81 |

Pressure deformation residue   22 h/70° C.

| System 1 150° C. | 20' | 37.1% |
|---|---|---|
|  | 25' | 29.9% |
|  | 30' | 26.1% |
| System 2 150° C. | 20' | 28.5% |
|  | 25' | 23.8% |
|  | 30' | 21.4% |

Chain fatigue after $5 \times 10^6$ flexures

| System 1 | Assessment 1 |
|---|---|
| System 2 | Assessment 0–1 |

Goodrich Flexometer

| System 1 | 150° C. | 25' | ΔT: | 18° C.; | creep: | −12% |
|---|---|---|---|---|---|---|
| System 2 | 150° C. | 25' | ΔT: | 12.9° C.; | creep: | −7.6% |

Ball crushing

| System 1 | 150° C. | 30' | Destroyed after 8,400 rotations |
|---|---|---|---|
| System 2 | 150° C. | 30' | Destroyed after 11,200 rotations |

EXAMPLE 4

A rubber premix based on natural rubber was prepared in an internal mixer from the constituents listed in Example 3. The following were subsequently added and incorporated by means of rollers:

| Comparison System (A) | 1.425 phr sulphur |
|---|---|
|  | 1.20 phr MBS |
| Comparison System (B) | 1.425 phr sulphur |
|  | 1.80 phr MBS |
| Systems 1–32 according to the invention | 1.425 phr sulphur |
|  | 1.40 phr MBS |
|  | additives variable (0.0058 mol each). |

|  | Reversion resistance after 45'/180° C. (%) |
|---|---|
| Comparison System (A) | 53.5 |
| Comparison System B | 62.0 |
| System |  |
| 1 | 77 |
| 2 | 77 |
| 3 | 71 |
| 4 | 86 |
| 5 | 71 |
| 6 | 76 |
| 7 | 77 |
| 8 | 73 |
| 9 | 73 |
| 10 | 84 |
| 11 | 82 |
| 12 | 81 |
| 13 | 74 |
| 14 | 73 |
| 15 | 66 |
| 16 | 77 |
| 17 | 79 |
| 18 | 75 |
| 19 | 76 |
| 20 | 78 |
| 21 | 82 |
| 22 | 76 |
| 23 | 76 |
| 24 | 78 |
| 25 | 68 |
| 26 | 73 |
| 27 | 75 |
| 28 | 78 |
| 29 | 78 |
| 30 | 78 |
| 31 | 78 |

-continued

| | |
|---|---|
| 32 | 80 |

Below is a list of the accelerator additives according to the invention corresponding to the general formula i which are used in Example 4:

| Serial No. | |
|---|---|
| 1 | bis-(pentachlorophenyl)-disulphide |
| 2 | bis-(pentachlorophenyl)-trisulphide |
| 3 | bis-(pentachlorophenyl)-tetrasulphide |
| 4 | pentachlorophenyl-dithio-2-ethanol |
| 5 | pentachlorophenyl-dithiocyclohexane |
| 6 | pentachlorophenyl-dithio-trichloromethane |
| 7 | (pentachlorophenyl-dithio)-acetaldehyde-diethyl acetal |
| 8 | bis-(pentachlorophenyl-dithio)-1,3-propane |
| 9 | pentachlorophenyl-dithio-2-propane |
| 10 | pentachlorophenyl-dithio-methane |
| 11 | bis-(pentachlorophenyl-dithio)-1,2-propane |
| 12 | pentachlorophenyl-dithio-1-propane |
| 13 | pentachlorophenyl-dithio-phenyl-methane |
| 14 | pentachlorophenyl-trithiocarbonate |
| 15 | bis-(2-methoxycarbonyl-phenyl)-trisulphide |
| 16 | bis-(2,4,5-trichlorophenyl)-disulphide |
| 17 | pentachlorophenyl-dithio-(4-chlorobenzene) |
| 18 | pentachlorophenyl-dithio-benzene |
| 19 | pentachlorophenyl-dithio-(4-methyl-benzene) |
| 20 | bis-(2-nitrophenyl)-disulphide |
| 21 | pentachlorophenyl-dithio-(2-nitrobenzene) |
| 22 | bis-(2-nitrophenyl)-trisulphide |
| 23 | pentachlorophenyl-dithio-(4-methylphenyl-sulphinate) |
| 24 | pentachlorophenyl-thio-(4-methylphenyl-sulphinate) |
| 25 | bis-(2-hydroxycarbonyl-phenyl)-tetrasulphide |
| 26 | pentachlorophenyl-2-(acetic acid monoglycol ester) |
| 27 | pentachlorophenyl-2-(aectic acid diethylene glycol monoester) |
| 28 | pentachlorophenyl-dithio-(2-acetic-acid-ethyl-ester) |
| 29 | pentachlorophenyl-dithioacetate |
| 30 | pentachlorophenyl-thioacetate |
| 31 | pentachlorophenyl-thiobenzoate |
| 32 | pentachlorophenyl-thio-propionate |

I claim:
1. A vulcanization system consisting of
   (a) 20–50 parts by weight of sulphur or 20–50 parts by weight of a sulphur donor,
   (b) 20–50 parts by weight of an accelerator of the mercapto or sulphenamide group,
   (c) 0–10 parts by weight of a conventional accelerator additive, and
   (d) 20–50 parts by weight of a compound corresponding to the general formula (i):

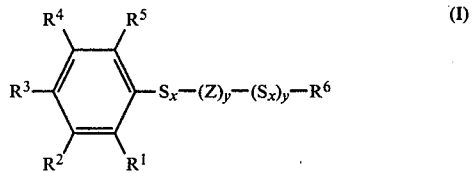

wherein
   $R_1$ to $R_5$ are identical or different and denote hydrogen, halogen, nitro, cyano, $CF_3$, $CCl_3$, carboxyl, an alkoxy group containing 1–4 C-atoms in the alkyl part, or a $C_1$–$C_4$ alkyl group but the groups $R_1$–$R_5$ must not all be hydrogen,
   x represents 1–4, preferably 2–3,
   y represents 0 or 1, and
   Z denotes divalent groups such as

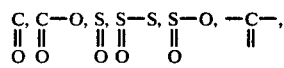

$C_1$–$C_{12}$ alkylene, $C_4$–$C_{12}$ cycloalkylene, $C_6$–$C_{10}$ arylene or $C_8$–$C_{12}$ arylalkylene, and
$R_6$ denotes the group corresponding to the formula:

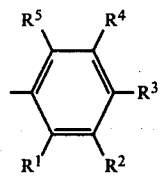

wherein $R_1$–$R_5$ have the meaning indicated above and may all be hydrogen;
$C_1$–$C_{12}$ alkyl or a $C_4$–$C_{12}$ cycloalkylene optionally substituted by OH and/or alkoxy with 1–4 C-atoms in the alkoxy group;
benzyl or trichloromethyl.

2. A vulcanization system according to claim 1, consisting of
   (a) 40 to 50 parts by weight of sulphur or 40–50 parts by weight of a sulphur donor,
   (b) 20 to 30 parts by weight of an accelerator of the mercapto or sulphenamide group,
   (c) 0 to 5 parts by weight of a conventional accelerator additive, and
   (d) 20 to 30 parts by weight of a compound corresponding to the general formula (1).

3. A vulcanization mixture consisting of natural and-/or synthetic rubber obtained from halogen-free dienes, a vulcanization system according to claims 1 or 2 and optionally conventional additives.

4. A process for the vulcanization of natural and/or synthetic rubber from halogen-free dienes in the presence of sulphur and/or sulphur donors, vulcanization accelerators and optionally the usual additives, characterised in that
   (a) 0.1–5 phr of sulphur or 0.2–10 phr of a sulphur donor,
   (b) 0.1–5 phr of an accelerator of the mercapto or sulphenamide group,
   (c) 0–5 phr of a conventional accelerator additive, and
   (d) 0.1–5 phr of a compound corresponding to the general formula (1) of claim 1
are added to the rubber separately or together and the mixture is subsequently vulcanized in the usual manner.

5. A process according to claim 4, characterised in that
   (a) 1–2 phr of sulphur or 2–4 phr of a sulphur donor,
   (b) 0.4–2 phr of an accelerator of the mercapto or sulphenamide group,
   (c) 0–1 phr of a conventional accelerator additive, and
   (d) 0.4–2.5 phr of a compound corresponding to the general formula 1 or 4 of claim 1
are added to the rubber separately or together and the mixture is subsequently vulcanized in the usual manner.

6. A process according to claims 4 or 5, characterised in that vulcanization is carried out at temperatures of from 100° to 300° C.

* * * * *